United States Patent
Chow et al.

(10) Patent No.: US 6,614,854 B1
(45) Date of Patent: Sep. 2, 2003

(54) SYSTEM AND METHOD FOR ADAPTIVE PREDISTORTION

(75) Inventors: Peter El Kwan Chow, Orlando, FL (US); Roger A. Babb, Orlando, FL (US); Donna M. Krizman, Orlando, FL (US)

(73) Assignee: Carriercomm, Inc., Santa Barbara, CA (US)

( * ) Notice: Subject to any disclaimer, the term of this patent is extended or adjusted under 35 U.S.C. 154(b) by 0 days.

(21) Appl. No.: 09/322,243

(22) Filed: May 28, 1999

(51) Int. Cl.[7] .................... H04K 1/02; H04L 25/49
(52) U.S. Cl. ............... 375/297; 330/302; 332/162; 455/126
(58) Field of Search ............... 375/296, 297; 330/107, 149, 294, 302; 332/159, 103, 160, 161, 162; 455/126, 114, 115, 127

(56) References Cited

U.S. PATENT DOCUMENTS

| | | | |
|---|---|---|---|
| 4,291,277 A | * | 9/1981 | Davis et al. ............ 330/149 |
| 4,453,133 A | | 6/1984 | Travis |
| 4,698,597 A | | 10/1987 | Merli et al. |
| 5,204,881 A | | 4/1993 | Cardini et al. |
| 5,291,148 A | | 3/1994 | Reisner et al. |
| 5,740,520 A | | 4/1998 | Cyze et al. |
| 5,900,778 A | * | 5/1999 | Stonick et al. .......... 330/149 |
| 6,072,364 A | * | 6/2000 | Jeckeln et al. .......... 330/149 |
| 6,141,390 A | * | 10/2000 | Cova .................... 375/297 |

OTHER PUBLICATIONS

Stapleton et al., A New Technique for Adaption of Linearizing Predistorter, IEEE Vehicular Technology Conference, May 1991.
Mingo et al., Amplifier Linearization Using a New Digital Pre-distorter for Digital Wireless Communication Systems, IEEE Vehicular Technology Conference, May 1997.
Adaptive Modulation System with Discrete Power Control and Pre-distortion-type Nonlinear Compensation for High Spectral Efficient and High Power Efficient Wireless Communication Systems, IEEE VTC, 97.

* cited by examiner

*Primary Examiner*—Don N. Vo
(74) *Attorney, Agent, or Firm*—Fulbright & Jaworski L.L.P.

(57) ABSTRACT

Distortion introduced into a multiamplitude signal format or amplitude and phase signal format by a high power microwave amplifier is compensated by a system which adapts itself to non-linearities present in the amplifier and predistorts the input signals before they are subjected to the non-linearities created by the amplifier. The degree of predistortion is non-fixed and varies or is updated as the non-linear conversion characteristics of the amplifier change with time. The distortion can also be compensated by using a power curve look-up table.

43 Claims, 3 Drawing Sheets

PRE-DISTORTION CIRCUIT
TRANSFER CHARACTERISTIC

AMPLIFIER TRANSFER CHARACTERISTIC
AT ONE OUTPUT POWER LEVEL

SYSTEM AND METHOD FOR ADAPTIVE PREDISTORTION

REFERENCE TO RELATED APPLICATIONS

Reference is also made to the following co-pending and commonly assigned U.S. patent application entitled "COMMERCIAL NETWORK BASED ON POINT TO POINT RADIOS", Ser. No. 09/245,701, filed Feb. 6, 1999, the disclosure of which is incorporated herein by reference.

TECHNICAL FIELD

The present invention relates to communication systems and is particularly directed to a system for counteracting the non-linear behavior of power amplifiers, such as may be used in microwave communication.

BACKGROUND

Transmission of radio signals over the (i.e., use of a wireless link) air provides many advantages over other transmission media for communication systems. Radio systems do not require installation of a transmission medium between stations, avoiding the expense of installing and maintaining fiber optic or electrical cables. Thus, communication systems using radio links are particularly well suited to installations where adverse/hostile terrain, existing infrastructures and/or regulations make installation of cable, or other media, prohibitive.

A problem inherent in many radio systems, particularly those operating in the 20–40 GHz range, is variable path fade caused by changing atmospheric and environmental conditions, such as precipitation and varying foliage at microwave facility sites and along transmission paths. It should be appreciated that the propagation loss for high frequencies, such as the aforementioned 20 to 40 GHz systems, varies greatly depending on such dynamic circumstances. For example, from a clear to rainy day signal attenuation or signal loss variation can be as much as 40 dB per km. Accordingly, in order to ensure a sufficient signal margin to consistently provide an adequate signal-to-noise ratio during periods of extreme signal attenuation, it may be necessary to increase the power output of a transmitter to accommodate worst case conditions. This, however, results in excessive output levels during periods of reduced signal attenuation. Not only does use of a constant high power level waste power and result in increased maintenance, it may result in a receiver associated with a different transmitter/receiver pair experiencing interference particularly during those periods of reduced attenuation. The use of excess power unnecessarily enlarges the antenna beam contour of a transmitter and may result in unwanted signal distortion associated with such higher transmitter power levels. This distortion is because microwave systems previously mentioned generally employ high power amplifiers, as part of the signal transmission or transponder sections of the system. When the transmit power level is increased to overcome signal attenuation, the amplifier may be pushed into saturation where it will exhibit non-linear characteristics and distort the transmitted signal. This distortion is a primary impediment to reliable spectrally-efficient digital or other signaling using such amplifiers.

More particularly, when a signal containing amplitude variations is amplified, it will suffer distortion if the amplifier does not exhibit a linear amplitude transfer characteristic. This means that the output is not linearly proportional to the input. The signal will also suffer distortion if the phase shift introduced by the amplifier is not linear over the range of frequencies present in the signal, or if the phase shift caused by the amplifier varies with the amplitude of the input signal. The distortion introduced further includes intermodulation of the components of the input signal. The products of the intermodulation appear (i) within the bandwidth of the signal causing additional undesirable distortion and (ii) extend outside the bandwidth originally occupied by the signal causing interference with adjacent channels and possibly violating licensing and regulatory spectral emission requirements. Although filtering can be used to remove some unwanted out-of-band distortion, this is not always practical, especially if the amplifier is required to operate on several different frequencies. Distortion products which are at multiples of the carrier frequency can also be produced in a nonlinear amplifier, although these can be removed by relatively simple filtering techniques.

Intermodulation is also a problem when multiple signals are amplified in the same amplifier even if, individually, the signals do not have amplitude variations. This is because the combination of the multiple signals produces amplitude variations as the various components combine with each other by adding and subtracting as their phase relationships change.

Amplifiers can introduce some distortion even if they are well designed. Perfect linearity over a wide range of amplitude is difficult to realize in practice. Moreover, as any amplifier nears its maximum output capacity, the output no longer increases as the input increases. At this point the amplifier is not linear. In fact, a typical amplifier becomes significantly nonlinear at a small fraction of its maximum power output capability. This means that, in order to maintain linearity, the amplifier is often operated at an input and output amplitude which is low enough such that the signals to be amplified are within the amplifier's substantially linear transfer characteristic. This brute force approach reduces the drive level into the amplifier, so that the amplifier output power is considerably below saturation where the magnitudes of the distortion are tolerable. This method of operation is referred to as "backed off". While this technique has been found to be useful and has been widely employed with amplifiers, it loses a great deal of its appeal if the amplifier has to be backed off excessively in order to obtain acceptable distortion levels, since every dB of amplifier back off causes a loss in dB of radiated power. This method wastes power and requires that the amplifier be large and relatively expensive. Further operating in a "backed off" mode is counterproductive to the previously mentioned method for boosting the power level to compensate for signal attenuation.

Another way to avoid distortion effects for digital modulation signaling is to use constant envelope type signals, such as unfiltered phase shift keying (PSK) or frequency shift keying (FSK) modulation. PSK and FSK signals are unaffected by non-linear distortion and the associated amplifiers can be smaller, run cooler, are more power efficient and less expensive. Unfortunately, such signaling schemes generally require a higher signal-to-noise ratio for a prescribed level of performance than other types of modulation (such as quadradture amplitude modulation (QAM)) that employ variations in amplitude to represent the data. Then too, many of the newer, bandwidth efficient modulation schemes use both amplitude and phase variations.

There is also a desire to be able to transmit multiple signals on different channels through a single amplifier. This reduces the number of separate amplifiers required and avoids the need for large, costly high level output signal combining filters which have undesirable power losses. This performance disparity between constant and non-constant amplitude signals increases in proportion to the data rate-signal bandwidth quotient (i.e., bits/sec/Hz). Accordingly, if the performance efficiency of a non-constant amplitude signal modulation scheme is to be obtained, compensation is necessary to account for amplifier distortion characteristics.

Another type amplifier used by microwave systems is the LINC (Linear Nonlinear Component) Amplifier. The LINC is based on generating amplitude variations in a signal by combining two signals which vary only in their relative phases. The vector sum of the two signals can represent any amplitude. Thus, it is possible to represent the instantaneous state of any signal or combination of signals. The phase and frequency of the component signals can also be made to represent that of the original so that when combined, the original signal is reconstructed. In spite of the fact that its theoretical efficiency can be very high, in a practical LINC transmitter the imbalance between the power gain and delay (or phase) of the two RF paths (especially for wideband applications) and the different non-linear characteristics of the two amplifiers limits the overall performance of the amplifier.

Because of these problems, various techniques have been developed for linearizing power amplifiers, correcting or compensating for nonlinearities using feedback, feed-forward, and predistortion processing.

Feedback is a mechanism in which a monitoring system looks at the output of the amplifier and attempts to alter the signal applied to the input of the amplifier so that it produces the intended output signal. This is arranged as a direct feedback loop. The delay in the feedback path means that the correction can be too late to offset unwanted distortions effectively, especially at higher bandwidths. Feedback reduces distortion at the expense of gain, often requiring further stages of amplification to produce the desired output.

Feedforward is widely used in commercial products which can amplify multiple signals and work over wide amplitude ranges. The method is quite complicated and the power efficiencies poor. Feedforward amplifiers are typically only 5% efficient. The complicated processing requirements also add to the cost and the power used and significant cooling capacity is required to remove waste heat. This is because the feedforward mechanism derives a signal which represents the inverse of the distortions produced by the amplifier by comparing the amplifier input and output to generate a difference signal representing a distortion signal. A small linear amplifier is used to amplify the distortion signal to the same level as that of the amplifier output. The amplified distortion signal is then subtracted from the main amplifier output. This method operates well over a wider bandwidth than, for example, the predistortion mechanism described below. However, balancing the amplitude and delay of the distortion signal so that it cancels the main amplifier errors exactly is complicated and costly to perform. For example, conventional feedforward arrangements require duplication of power amplifiers, one in each signal path, that are combined at the output. The amplifier duplication wastes power while the loss incurred by combining signals at the output reduces the effective output of the amplifier.

The predistortion type system attempts to compensate for the nonlinear transfer characteristic of an amplifier by forming an inverse model of its transfer characteristic. This transfer characteristic is applied to the low level signal at the input of the amplifier, to pre-distort the input signal such that, when it passes though the amplifier the signal emerges amplified and substantially undistorted. This method is capable of excellent results over a relatively small bandwidth. However, the predistortion mechanism has to be updated to account for variations in the amplifier transfer characteristic by monitoring the output and periodically updating the corrections. The filter also has to change its coefficients as often as every sample using the values stored in memory.

Therefore, there is a problem because existing amplifiers can be employed for linear amplification over only a relatively small range of input signal levels. Operation at or near saturation, while useful in attaining high values of efficiency, suffers from the foregoing forms of signal distortion.

Various implementations have been made to address the problems of the prior art using these techniques. For example, U.S. Pat. No. 4,291,277 to Davis describes a system which adapts itself to non-linearities of a power amplifier and predistorts the input signals. The system compensates in real or near real time (i.e., during the actual transmission of data) for distortion introduced by an amplifier during amplification. The digital signal, which is to be transmitted over microwave frequencies, is sent to a predistortion RAM and to a temporary storage buffer ROM. The predistortion RAM provides an input signal that will cancel the distortion characteristics of the amplifier. A portion of the amplifier output is fed back to a special receiver located with the transmitter which demodulates the signal and compares it to the original signal information sent to the ROM. The results of this comparison are used to update the predistortion RAM. The distortion-introducing behavior of the amplifier is continuously tracked. However, the method requires the use of a dedicated receiver circuit to demodulate and prioritize a sample of the amplifier signal.

Another implementation is described in a paper, entitled "A New Technique for Adaptation of Linearizing Predistorters", presented at the 41st IEEE Vehicular Technology Conference in May 1991. In this implementation, Stapleton and Cavers use a pre-distorter which adjusts to the drifting characteristics in the power amplifier. This technique, however, does not provide real-time adaptation during transmission. Instead, the authors describe sampling based on out-of-band power, and which uses this scalar quantity to adjust the pre-distorter coefficients.

In the system described by Stapleton and Cavers a first receiver is set to constantly receive signals of frequency F2. A second receiver is used to make periodic checks of the out-of-band power by sending the received signals to a pre-distorter. Adjustments are then made to the pre-distortion coefficients. During normal operation, both receivers are set to F2. The verification of the transmitter is made on an intermittent basis so as not to interfere with the system operation. This system, however, does not transmit the distortion information using the communication channel and the method requires a dedicated receiver in the feedback loop.

Another example of a transceiver for the correction of amplified radio signals is described by Cyze et al., U.S. Pat. No. 5,740,520. FIG. 1 of the Cyze et al disclosure depicts a transceiver including a transmitter and first and second receivers. The transmitter and first receiver are conventional components of a transceiver, operating on different frequencies F1 and F2 respectively, for full duplex communication. The second receiver is used as a diversity channel signal at a frequency F3. Frequency F3 may be set to be the same as transmitter frequency F1 during the calibration process.

During normal communication, data is applied to a modem with the output of the modem supplied to a predistorter for correction prior to being transmitted. The output from the predistorter is supplied to the transmitter which comprises a quadrature modulator and a power amplifier. The modulator modulates the "I" (In phase) and "Q" (Quadrature phase) components of baseband signals.

Cyze et al. further describes a transceiver which includes a transmitter for transmitting baseband signals at a first operating frequency. The transmitter also includes a lookup table (LUT) for storing correction coefficients for distorting the baseband signals, a pre-distorter for distorting the baseband signals and a receiver for receiving the baseband signals transmitted by a remote transmitter in a first mode and by the transmitter in a second mode. The receiver includes circuitry for processing the received baseband signals, a switching device for switching to the processing apparatus during the first mode and to the incoming signals to the lookup table up-dater during the second mode. The receiver also includes a lookup table up-dater, operative during the second mode, for receiving the signals transmitted by the transmitter and for updating the lookup table.

The lookup table, according to Cyze et al. stores both "I" and "Q" coefficients for distorting the baseband signals and requires periodic updating to compensate for variations in the amplifier's transfer characteristics. As in other prior art systems, a receiver must be dedicated to receiving update/calibration information (i.e., updates occur during standby, idle periods, or during no voice periods of normal communications).

SUMMARY OF THE INVENTION

The present invention provides a system and method which dynamically compensate for the non-linear behavior of power amplifiers used in digital data signal transmission systems over a wide range of gain and power output levels without the need for special purpose receiver circuitry, such as a receiver disposed at the transmitter. A preferred embodiment of the present invention utilizes signal measurements which may be made quickly, accurately, and without the need for expensive and complicated devices.

In one embodiment of the present invention, a predistortion system provides compensation for the non-linear behavior of an amplifier. The system may use a series of tables, such as for each fraction of dB throughout the operating range of an amplifier, that correlate the amplifier's output power to correction coefficients for the "I" (In phase) and "Q" (Quadrature phase) components of the baseband signal. The tables may include information regarding the amount of amplitude and phase compensation required to be applied to the "I" and "Q" components of the baseband signal to compensate or "null out" the distortion components introduced by the amplifier during or as a result of amplification. However, as the tables provide pre-distortion information related to the output power of the amplifier, such as by using the above mentioned series of tables indexed to output power level, a simple measurement of power at the output side of the amplifier can be used to adjust the predistorter.

In another embodiment of the present invention, a predistortion system provides for dynamic control of amplifier transfer characteristics, although the predistorter is placed in the circuit prior to signal attenuation or other amplified adjustment for power level control. Accordingly, the maximum output level of the predistortion circuitry is constant regardless of the actual signal power level desired for transmission. However, as the subsequent adjustment of signal amplified will affect the signal level in which the amplifier operates, the predistorter is adjustable in order to compensate for varying non-linearity in the operating range of the amplifier.

The predistortion system provides transmission such that the received distortion level experienced by the receiver of the transmitter/receiver pair is substantially reduced. Preferably, by detecting distortion in the signal at the receiver of the wireless link transmitter/receiver pair, the distortion introduced by the amplifier transfer characteristics may be compensated for. Moreover, the predistorter may compensate for the fluctuations in power level, circuit temperature and aging components, as dynamically experienced. Therefore, the distortion is lower under compensated-for conditions because the amount of predistortion is adjusted accordingly.

A closed feedback loop may be utilized to provide information regarding the distortion of a transmitted signal as experienced by the receiver of the transmitter/receiver pair. Accordingly, when the transmission signal is measured by the receiver, the system provides feedback to the transmitter in order to update tables of the preferred embodiment series of tables and to adjust the predistortion applied to the transmission signal. Such an embodiment allows for the series of tables to be updated to reflect nonlinear permanent changes to the output characteristic of the amplifier only as needed (i.e., infrequently), while utilizing the series of tables of the preferred embodiment to provide for predistortion adjustments typically requiring continuous feedback in prior art systems. This advantage of a preferred embodiment of the present invention is further synergized through the use of the preferred embodiment series of tables to compensate for environmental changes, thus eliminating the need for feedback regarding predistortion adjustment for such transient and inevitable changes in operating conditions.

When the receive signal is measured by the receiver to be at an acceptable level or to have acceptable characteristics, the system may provide appropriate feedback, or no response can be returned to the transmitter in order to maintain the current predistortion. For example, when the current predistortion table used is providing proper canceling of the amplifier-introduced distortion or when the transmitter's amplifier is operating in the linear region of amplification these measurements and/or their associated feedback are not necessary. The receive distortion level characteristics may be measured at the receiver by determining the distortion of signal amplitude and phase.

Preferably the receiver system operates to make the desired measurements and initially format the measured attributes for use in predistortion adjustment. Accordingly, only a relatively small bandwidth return signal path is needed by the feedback loop, while still providing a desired level of functionality. For example, the receiver may not only measure signal characteristics, but also may conclude that an adjustment is necessary to compensate for this distortion and, in a very few reverse link control channel bits, communicate the information necessary for proper predistortion to the transmitter. Accordingly, wasting of reverse channel bandwidth may be avoided by not providing the adjustment circuitry of the transmitter with information regarding each measurement made of the particular parameter or parameters, while only returning the data calculated by the receiver to be necessary for proper adjustment of predistortion.

An aspect of the system is that the system uses the data transmission circuitry to transmit distortion information between the transmitter and the receiver, thus eliminating the need for a dedicated receiver.

An object of the present invention is that it reduces signal distortion.

An object of the present invention is that it eliminates the need for calibration circuitry.

The system and method adapts itself to non-linearities of a power amplifier in order to maintain desired performance levels (i.e., reduce the distortion level by forming an inverse model of its transfer characteristic). This transfer characteristic is applied to the low level signal at the input of the amplifier, to pre-distort it such that when it passes though the amplifier the signal emerges amplified and substantially undistorted. The compensation is accomplished without an additional or dedicated receiver circuit.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 1A:
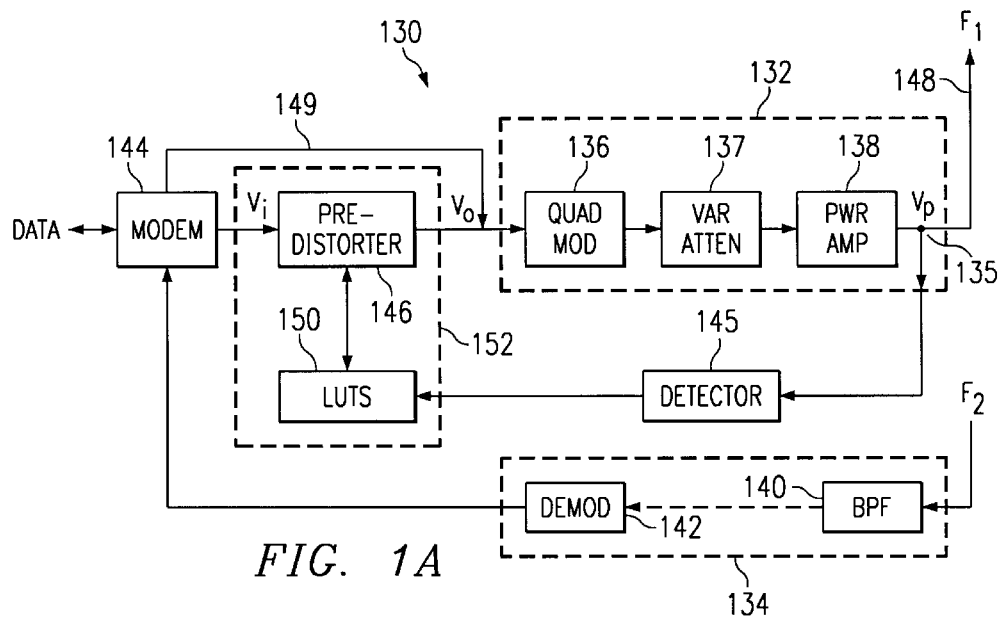
FIG. 1A is block diagram of an embodiment of the present invention.

Reference is now made to FIG. 1A which illustrates a transceiver, generally designated 130, used for correction of non-linearization in accordance with a preferred embodiment of the present invention. Transceiver 130 may comprise a transmitter, generally designated 132 and a receiver, generally designated 134. Transmitter 132 and receiver 134 preferably operate on different frequency channels F1 and F2 respectively, for full duplex communication.

Transmitter 132 may include a quadrature, or other, modulator 136, a variable attenuator, or other signal manipulation device, 137 and a power amplifier 138. Modulator 136 modulates the "I" (In Phase) and "Q" (Quadrature phase) components of the baseband signals onto the transmitted frequency F1 (it shall be appreciated that although not shown in FIG. 1A, the signals operated upon by modem 144, predistorter 146, modulator 136, attenuator 137, and amplifier 138 preferably include I/Q components). Variable attenuator 137 controls the power output of the transmitted signal. Receiver 134 may comprise a bandpass filter (BPF) 140 and a demodulator 142. The preferred embodiment demodulator 142 demodulates the radio frequency (RF) band signal to a baseband signal having the desired I/Q components.

Transceiver 130 further preferably comprises a modem 144, a power output detector 145, and predistortion circuitry 152, preferably including pre-distorter 146, and a series of look-up tables (LUTs) 150, as will be described in further detail herein below. Modem 144 preferably modulates/demodulates data signals, such as digital data streams from an information processing system, i.e. user computer system or telephony system, to/from a desired baseband signal.

Figure 1B:
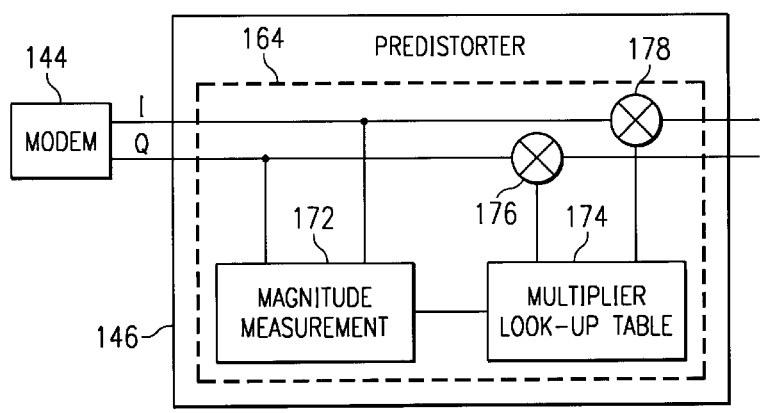
FIG. 1B is a block diagram of a preferred embodiment of the predistorter of FIG. 1A.

Directing attention to FIG. 1B, a block diagram of a preferred embodiment of predistorter 146 is shown. Here the I/Q components of the signals operated upon are shown to more readily illustrate operation upon the signal. Predistorter 146 of this preferred embodiment includes correction unit 164 having I/Q signal component magnitude measurement circuitry (magnitude measurement 172), I/Q signal component multiplier lookup table 174 (lookup table 174), and I and Q signal component multipliers 176 and 178. Accordingly, predistorter 146 operates to monitor I and Q inputs, calculate the magnitude, and from the magnitude calculated choose a row in lookup table 174 providing the proper I and Q signal component multipliers to properly compensate for amplifier distortion.

Use of amplifier 138 with the above described predistorter 146 alone might provide satisfactory linearization of signals where the amplitude of a signal provided to predistorter 146 is substantially the same as that provided to amplifier 138. For example, where an attenuator providing control of the power output of the transmitted signal is disposed in the circuit before predistorter 146, the above described predistorter may provide linearization throughout an acceptable range of operating conditions because all the voltages at the predistorter and amplifier are related directly.

However, directing attention again to FIG. 1A, it can be seen that a preferred embodiment of the present invention disposes attenuator 137 in the signal path after modulator 136, which places attenuator 137 in the signal path between predistorter 146 and amplifier 138. Accordingly, voltages as seen by predistorter 146 are no longer directly related to those as seen by the amplifier 138 and will change as the output power level is adjusted by attenuator 137. Nevertheless, the preferred embodiment of the present invention disposes attenuator 137 in the signal path between predistorter 146 and amplifier 138, at a point after modulator 136, as operation of modulator 136 over a large dynamic range often results in undesired output signal characteristics, such as leakage of a local oscillator (LO) frequency into the modulated signal. By disposing attenuator 137 in the signal path after modulator 136, its operating range may be substantially fixed and therefore its circuitry tuned to provide superior output characteristics within this substantially fixed operating range.

To accommodate manipulation of a signal or its components between operation thereon by predistorter 146 and amplifier 138, the preferred embodiment of the present invention provides for altering or updating of multiplier lookup table 174 of predistorter 146. However, to avoid the requirement of continuously monitoring the characteristics of a received signal and determining the distortion characteristics, and the associated processing power required and latency introduced, the preferred embodiment of the present invention utilizes a set of multiplier lookup tables, each useful as a multiplier lookup table 174, which provide the appropriate multiplier information over a range of amplifier 138 operating conditions. In the preferred embodiment, to accommodate the indirect amplitude relationship of the signal as seen by predistorter 146 and amplifier 138, the preferred embodiment of the present invention utilizes the aforementioned series of LUTs 150 which include a plurality of lookup tables adapted for various operating conditions of amplifier 138.

Figures 2, 3A:
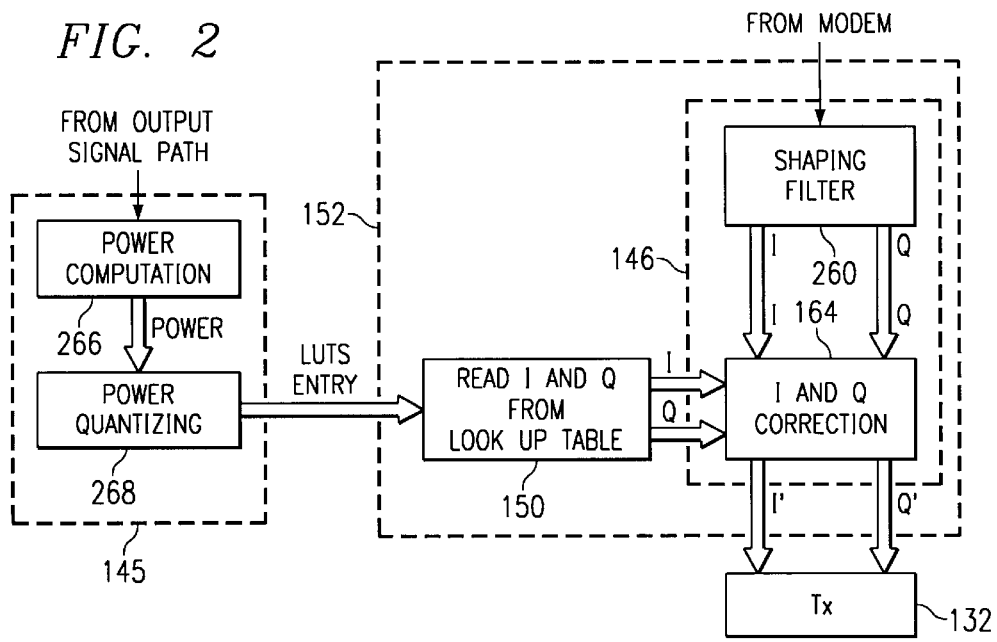
FIG. 2 illustrates the operation of a pre-distorter according to the present invention.
FIG. 3A is a series of predistortion tables for an embodiment of the present invention.
Figure 3B:
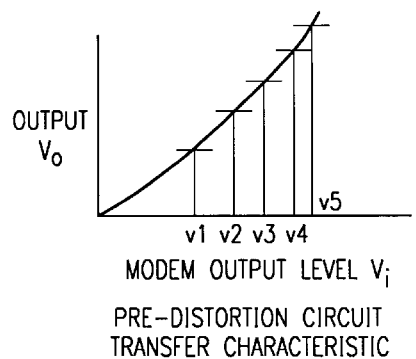
FIGS. 3B and 3C are the transfer characteristics utilized in generating predistortion tables o a preferred embodiment.
Figure 3C:
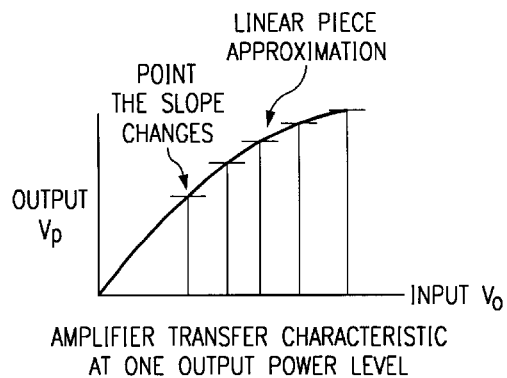

According to a preferred embodiment, when out of service, preferably at the time of initial manufacture, the amplifier 138 is analyzed to determine the amplifier's transfer characteristics based on the amplifier's output power, such as shown in FIG. 3C. Accordingly, a series of tables, such as shown in FIG. 3A corresponding to LUTs 150 of FIG. 1, may be generated that correlate the amplifier's output power to correction coefficients for "I" and "Q" components of a baseband signal at various power levels, such as in FIG. 3B. The tables may include information regarding the amount of amplitude and phase compensation required to be related to the "I" and "Q" components of the baseband signal to null the distortion components introduced by the amplifier during amplification.

The preferred embodiment compensation tables may be generated for the full operating range of the amplifier, such as for all possible power output levels of the amplifier. However, in operation, tables including compensation values are only necessary when the amplifier is operating in a non-linear region, although the preferred implementation also utilizes a unity table (entries of all ones-unitary compensation values) in order to provide a multiplier as utilized by the implementation for use in times when the amplifier is operating in the linear region. Moreover, although operating and/or environmental characteristics such as temperature may affect the performance of an amplifier, i.e., may shift the power curve of power out to power in, the characteristics of the power curve, i.e., the function relating power out to power in, has been found not to vary significantly for such changes in operating characteristics. Specifically, the operating characteristic curve has been found to shift horizontally, not changing significantly in curvature, and therefore if a determination can be made as to where the system is operating on the curve, such as through the preferred embodiment power output determination, a determination can be made as to where on the curve the system is operating regardless of the above mentioned factors affecting performance of the amplifier. Accordingly, tables are not required for all operating conditions where information sufficient to identify where in the non-linear range the amplifier is operating irrespective of such operating conditions.

In an embodiment of the invention, a table can be provided for a desired resolution, such as every ½ dB of output power within a range of the possible output powers, for example, such that a non-linear range of 15 dB would provide for the generation of 30 such tables (appreciating that in a preferred embodiment 31 tables would be utilized in order to provide the aforementioned unitary table). It should be appreciated that the number of tables generated and utilized is dependent on the granularity or resolution of the measurements to be made in their selection for use according to the present invention. For example, the resolution of the preferred embodiment amplifier output power measurement may affect the ability to select between lookup tables associated with very close in magnitude output power levels. Therefore, it may not be desirable to provide lookup tables separated by a measured characteristic of less than a resolution by which this characteristic may be accurately and confidently measured.

The preferred embodiment utilizes ½ dB increments between the data of the lookup tables utilized by the predistorter in order to provide a desired level of output signal quality, i.e., if larger, and therefore easier to measure, increments were utilized, the predistortion characteristics would not as accurately match the distortion characteristics of the amplifier for the full range of output power levels between the incremental lookup tables. Accordingly, the preferred embodiment of the present invention utilizes lookup tables of sufficient resolution to provide a desired level of output signal quality, in the most preferred embodiment ½ dB lookup table increments.

Once the tables are derived according to the present invention, they may be loaded into a memory of a microwave radio transmitter prior to shipping from the factory for use in determining predistortion characteristics when the amplifier is operating in the non-linear range. Accordingly, by using the above mentioned preferred embodiment power curve information providing distortion information independent of operating characteristics, the preferred embodiment lookup tables do not require any in service creation/updating in order to effectively operate the transmitter. In contrast, previous systems that used a lookup table feature required continuous updating of the table to compensate for variations of the amplifier's transfer functions due to changes in power level, temperature and aging amplifiers. Moreover, the table update process in previous systems requires an additional receiver or dedicated receiver (i.e., updates occurs during stand by, idle periods, or during no voice periods during normal communications) in order to detect the effects of distortion experienced under the actual operating conditions. The present invention eliminates the requirement to update the tables because the amplifier has been fully and precisely characterized in the factory utilizing power curve information to identify distortion present in operation based on that measured with respect to operation at that position on the power curve in testing upon manufacturing. Of course, as will be discussed in more detail herein below, the lookup tables of the present invention may be occasionally or periodically updated in order to reflect changes in amplifier, or other circuitry, operation over time, if desired. However, it should be appreciated that such updating is less burdensome on the system as updating is not required constantly. Moreover, any latencies associated with such updating are insignificant in such an occasional or periodic updating scheme unlike the substantial effect such latencies cause in prior art systems.

During data transmission, the amplifier 138 amplifies an up-converted RF signal for transmission by antenna 148. The amplifier's output 138, which has been compensated for by applying a predistorted or converted signal to cancel distortion introduced by the amplifier 138, is sampled by RF coupler 135 and fed back to an output signal characteristic measurement circuit such as a power output detector 145. The output power level is determined by the detector 145 and transmitted to the LUTs 150 to be correlated with the "I" and "Q" components stored in the tables.

It should be appreciated that, as discussed above, variable attenuation 137 is disposed in the signal path after the predistorter 146 in the preferred embodiment of FIG. 1A. Generally, such an attenuator is disposed in the signal path prior to the RF up converter to control or minimize the leakage from the carrier frequency to the output of the up converter. Similarly, as the predistortion circuit of such systems is generally operated to compensate for the distortion experienced, i.e., controlled by comparing the undistorted input signal to the distorted output signal, the attenuator is generally disposed in the signal path prior to the predistortion circuit to provide a direct relationship between the signal components as measured and/or manipulated by the predistorter and as manipulated by the amplifier. However, as the predistorter of the preferred embodiment of the present invention operates to provide a predistortion signal based on amplifier output power, due to the use of the above described lookup tables establishing a relationship for such adjustments, the attenuator adjusting signal amplitude is preferably disposed after the modulation circuitry, and in the preferred embodiment after the predistortion circuitry, in order to provide for a modulator input signal level unaffected by the attenuator used in adjusting output power and, thus, a signal to be modulated having a narrow range of amplitude variation, regardless of the actual attenuation ultimately provided by the attenuator. This arrangement operates to significantly simplify the circuitry required in implementing this preferred embodiment of the present invention.

Reference is now made to FIGS. 2 and 3A. FIG. 2 illustrates the operation of a preferred embodiment predistortion circuitry 152. FIG. 3A illustrates a preferred embodiment of the structure of LUTs 150.

Referring to FIG. 2, signals from modem 144 are applied to and compensated for non-linearization by predistorter 146 prior to amplification and transmission. Predistorter 146 of the preferred embodiment of FIG. 2 comprises a shaping filter 260, and a correction unit 164. Shaping filter 260 filters the "I" and "Q" components of the signal. Correction unit 164 applies the revised "I" and "Q" values from the correction coefficients stored in a selected one of LUTs 150. The one of LUTs 150 utilized by correction unit 164 at any particular time is preferably selected according to information provided by detector 145. It shall be appreciated that operation of the embodiment of the present invention illustrated in FIG. 2 does not require the use of an error extractor to compare the filtered "I" and "Q" components to those of the amplifier output. Instead, simple signal measurements, such as the preferred embodiment power measurements, are made, which may be accomplished quickly, with no or a minimal amount of processing delay, by relatively simple and inexpensive circuitry.

For example, in the preferred embodiment of FIG. 2, detector 145 includes a power computation unit 266 to extract power information from a sampled output signal. The preferred embodiment detector 145 also includes a power quantizing unit 268 to properly correlate the computed power to the entries of a series of LUTs in communication therewith, such as LUTs 150.

Preferably each look-up table stored in the LUTs 150, contains correction coefficients (δI and δQ) for respective values of "I" (In phase) and "Q" (Quadrature phase) components of the baseband signal. Look-up tables 355 (FIG. 3A) preferably comprise columns, 370, 372 and 374, associated with "Amplifier Output Power Level", "δI" and "δQ", respectively. δI and δQ are the correction coefficients which are used to adjust the values of "I" and "Q" of the baseband signal.

In operation, the signal to be transmitted is applied to predistorter 146, where the signal is filtered by shaping filter 260. Power computation unit 266 measures the output power level of amplifier 138. Power table correlator unit 268 correlates the received value of the amplifier's output to one of the tables stored in the LUTs 150. The corresponding values of "δI" and "δQ" are then read from the proper look-up table (LUT) 355. The revised values of I' and Q' are calculated by correction unit 164, as follows:

$$I'=I*\delta I-Q*\delta Q; \text{ and}$$

$$Q'=I*\delta Q+Q*\delta I;$$

where: I and Q are the uncorrected values and δI and δQ are the correction coefficients.

The corrected signal, comprising the revised values of I' and Q', is then provided to transmitter 132 for amplification by amplifier 138 wherein the distortion characteristics thereof operate to null the pre-corrected values of I' and Q'.

Figure 4:
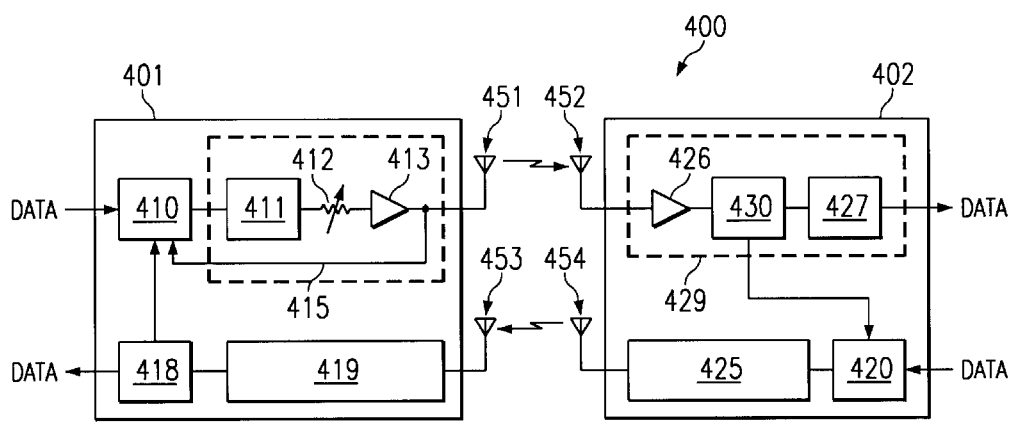
FIG. 4 is block diagram of an embodiment of the present invention.

Reference is now made to FIG. 4 which illustrates another embodiment of the communication system, generally designated 400, using predistortion for correction of non-linearization of the amplifier. Node 401 may comprise predistortion circuit 410 substantially as described above with respect to predistortion circuitry 152, and transmitter 415, substantially as described above with respect to transmitter 132, including for example, an up-converter 411, a variable attenuator 412, and power amplifier 413. The predistortion circuit 410 compensates for the non-linearity characteristics of the amplifier by distorting the signal before amplification, wherein predistortion components are added to the input signal to provide destructive interference between the predistortion components and the distortion introduced by the amplifier while in the process of amplifying. As described above, predistortion circuit 410 distorts the baseband signals to form an inverse model of the amplifier transfer characteristics. The output of the predistorter is up-converted by up-converter 411 to a transmission frequency which is applied to the power amplifier 413. The signal level may be controlled by means of a voltage controlled variable attenuator 412. Amplifier 413 boosts the amplitude level of the distortion compensated signal for transmission by the antenna 451.

Amplifier 413 may be any suitable RF amplifier for use in any type of wireless communication such as, radio or microwave. However, the distortion characteristics of the amplifier over the intended operational range are preferably known and used by the predistorter to provide an input signal to the amplifier that will cancel the distortion introduced by the amplifier during amplification. The preferred embodiment utilizes signal power level measurements, as described above, in order to determine a proper amount of predistortion to be introduced into the signal. However, these distortion characteristics may be related to various parameters or combinations thereof, such as measured characteristics of a transmitted signal or other operational characteristics, including input power, amplifier gain, output power, modulation type, data encoding, circuit temperature, aging components or the like.

Node 402 of the preferred embodiment of FIG. 4 receives signals, via antenna 452, from node 401, such as through receiver 429, including low noise amplifier 426 and demodulator 427, and returns information regarding the signal's characteristics, such as may be sampled or measured by device 430, by a communication channel, such as a radio overhead channel available in the reverse link. A closed loop may be established by transmitting information regarding the signal by the overhead data via antenna 454 and 453 between the transmitter and the receiver of nodes 402 and 401. This embodiment of the invention transmits specialized overhead data, such as through transmitter 425, preferably adapted similarly to transmitter 415 and also preferably utilizing a predistorter circuitry (not shown) where node 402 including the use of an amplifier operating in a non-linear region. This overhead may be information such as the measured power level or even the predistortion requirements, in the payload section of a modem frame. The overhead data is preferably added to the user payload data by controller or multiplexer circuitry 420 and the combination is presented to a transmitter modem as payload-only data for transmission. A similar process at node 401 extracts the overhead data from the payload data presented by the receiving modem. The overhead data can include information that is used to interpret the payload data and to identify which type of communications protocol it represents. The overhead data can also include network management information for use by a communications processor. For example, the preferred embodiment transmits information regarding the predistortion requirements as overhead data as shown and described in the above referenced patent application entitled "COMMERCIAL NETWORK BASED ON POINT TO POINT RADIOS".

Node 401 preferably receives data transmitted by node 402 via antenna 453 through receiver 419, preferably adapted similarly to receiver 429 of node 402. Controller or demultiplexer circuitry 418 preferably separates the measured characteristics information or predistortion requirements from the received data stream and provides this information to predistortion circuitry 410. This information may be utilized by predistortion circuitry 410 to determine the actually experienced signal characteristics, such as may reflect operational characteristic changes due to component aging or other factors, and, thus be utilized in updating the information, such as the δI and δQ correction coefficients of particular lookup tables associated with various output power levels of amplifier 413. For example, such updates may occur whenever a particular signal quality threshold has been crossed, i.e., a predetermined variation in experienced I and/or Q component attributes as compared to expected attributes is determined from the measurements at receiver 402. Additionally, or alternatively, such updates may be periodic, such as occurring at particular intervals or upon the occurrence of a particular condition, thus providing measurement and associated feedback at receiver 402 at such periods. Irrespective of the triggering events for lookup table updating, predistortion circuitry 410 may operate as described above with respect to FIG. 2, with various information within the lookup tables so utilized being updated according to this embodiment of the present invention.

However, it should be appreciated that the use of a closed loop including transmitter circuitry of node 401 and receiver circuitry of node 402 may benefit from adaptation deviating from that shown in FIG. 2. For example, in order to minimize the amount of data transmitted in the reverse link between these nodes, portions of the processing shown in the measurement circuit of lookup tables of FIG. 2 may be accomplished at node 402. In a preferred embodiment, device 430 provides the power computation of detector 145 and provides a result from transmission in the reverse link for further processing at node 401, including identifying particular predistortion attributes to use from LUTs 150 disposed at node 401.

Figure 5:
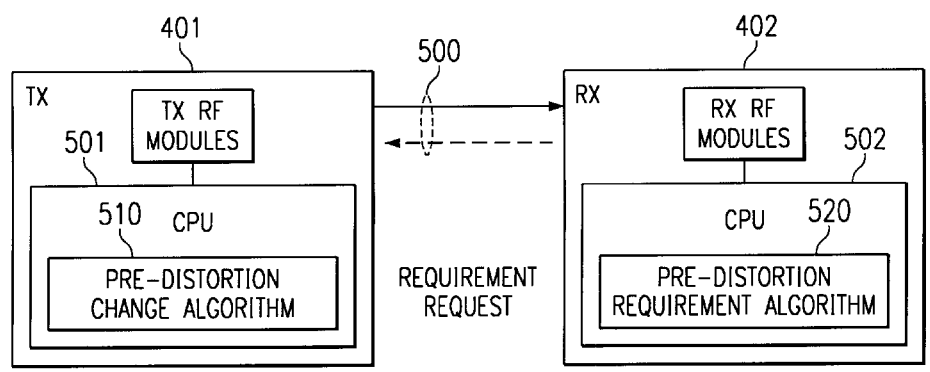
FIG. 5 is block diagram of an embodiment of the present invention.

In alternative embodiments more of this functionality may be disposed at node 402. For example, LUTs 150 may be disposed at node 402, thereby allowing the identification of particular predistortion requirements to be transmitted in the reverse link. As shown in FIG. 5, this embodiment of the present invention includes two parts functioning to provide a closed loop control system. A portion of the control system is deployed in or with node 402 as controller 502 providing operation according to predistortion requirement algorithm 520, and another portion of the control system is deployed in or with node 401 as controller 501 providing operation according to predistortion change algorithm 510, in communication through link 500.

An advantage in providing the control system at least in part in the receiver is that it is at the receiver that the signal characteristics as actually experienced over the link are easily measured. An advantage in providing the control system at least in part in the transmitter is that not only may the controller operate to adjust the transmitter as requested, but if any fault develops in the system, the control system may recognize the fault condition and alert a technician to check the transmitter in response to the fault condition. For example, if the requested distortion compensation is not detected at the receiver of node 401 an alert may be established to check the transmitter at node 402. Moreover, this arrangement allows the transmitter to adjust the predistorter characteristics due to distortion introduced through portions of the signal path in addition to the transmitter amplifier, such as may be caused by changes in power level, temperature and aging amplifiers and other factors and conditions. Accordingly, the lookup tables utilized for predistortion in such an embodiment may be updated to include characteristics determined to properly compensate for such changes. In order to reduce the amount of reverse channel data utilized in this embodiment, it is preferred that the lookup table information be stored at the system making comparisons of the distorted signal and updating the lookup tables, such as at node 402 as shown in FIG. 5.

In this preferred embodiment, predistortion requirement algorithm 520, operating on a processor based system such as with CPU 502 of node 402, is coupled to receiver circuitry, to accept signals therefrom and to determine the distortion related characteristics attributes of the received signal (i.e., "I" and "Q" components are detected and compared to the desired "I" and "Q" components). A request of predistortion change, i.e., a request to update a table associated with the particular amplifier output level associated with the signal measured, will be sent, such as through a reverse channel of link 500, to node 401 on the other side of the radio link.

Similarly, in this preferred embodiment, predistortion change algorithm 510, operating on a processor based system such as CPU 501 of node 401, is coupled to transmitter circuitry to accept the request from predistortion requirement algorithm 520 and determine whether node 401 should be adjusted as requested or not. If it is determined that the node 401 should be adjusted, a command signal is provided by predistortion change algorithm 510 to adjustment circuitry of node 401, such as an electronic controlled predistorter located in the transmit signal path as described with respect to FIG. 2.

It shall be appreciated that in a typical point-to-point system each site includes both a transmitter and a receiver, i.e., a reverse link substantially the same as the forward link exists for each transmitter/receiver pair. Generally this reverse link operates at a different frequency than that of the forward link, i.e., frequency division of forward channels and reverse channels. Of course, the reverse link may be established through time division duplexing (TDD), time division multiplexing (TDM), code division multiple access (CDMA), or other such multiple access schemes, if desired. The reverse link is generally utilized for subscriber payload, i.e., the subscriber utilizes a bidirectional information link. Often, however, a control channel is included in this reverse channel link (control channels may also be included in the forward link). Accordingly, the present invention may use this reverse control channel in providing a link between the portion of the control system disposed in the receiver and that disposed in the transmitter.

It should be appreciated that although the preferred embodiment described above utilizes CPUs associated with node 401 and node 402 for operation of predistortion change algorithm 510 and predistortion requirement algorithm 520 respectively, this is not a limitation of the present invention. For example, an alternative embodiment of the present invention may utilize general purpose processor based systems, such as a personal computer system based on the INTEL 80X86 family of central processors, having memory associated therewith in order to store and execute the above algorithms and being adapted to interface with node 401 or node 402.

Additionally, although the preferred embodiment described above is shown to utilize transceivers having a reverse link for user payload, there is no such limitation to the present invention. For example, a discrete wireless control channel may be utilized when no user payload reverse link exists. Moreover, there is no requirement that the control channel link be wireless. For example, the signal characteristics information or predistortion information may be communicated through means such as a local area network (LAN), a wide area network (WAN), the Internet, a public switched network (PSN), or even a cable system connecting the nodes or otherwise providing the desired information communication.

It should be appreciated that, although preferred embodiments of the present invention have been described herein with reference to lookup tables, that the present invention is not limited to use of any particular form or format of data compilations. Accordingly, any number of data compilations, including a database or a set of related databases, may be used according to the present invention whether such data compilations are generally referred to as lookup tables or not.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of transmitting a signal having desired characteristics, comprising the steps of:
    storing a set of lookup tables of correction parameters for correcting a baseband signal, wherein lookup tables of said set correspond to different conditions of an operating attribute of an amplifier used in transmitting said signal;
    detecting a condition of an attribute of an output signal of said amplifier;
    selecting a current lookup table of said set for use in manipulating a modulated signal, wherein selection of a current lookup table by said selecting step is at least in part a function of said condition of said operating attribute of said amplifier;
    accepting a data signal to be transmitted;
    modulating said accepted data signal to provide said modulated signal;
    distorting said modulated signal as a function of said current lookup table; and
    amplifying said modulated signal to supply said output signal.

2. The method according to claim 1, further comprising the steps of:
    identifying distortion characteristics corresponding to a plurality of conditions of said operating attribute of said output signal; and
    inverting said distortion characteristics to form respective ones of said correction parameters.

3. The method according to claim 1, wherein said condition of said output signal is a scalar quantity.

4. The method according to claim 3, wherein said scalar quantity is power output.

5. The method according to claim 1, further comprising the steps of radiating said output signal into space;
    receiving the radiated output signal;
    detecting in-phase and quadrature components of the received signal; and
    updating ones of said distortion characteristics corresponding to said operating attribute.

6. The method according to claim 5, further comprising the step of:
    transmitting information as a finction of said detecting in-phase and quadrature components step from a location of said receiving to a location of said radiating.

7. The method according to claim 6, wherein said information includes unrefined data provided by said detecting in-phase and quadrature components step.

8. The method according to claim 6, wherein said information includes update distortion characteristics.

9. The method according to claim 1, further comprising the steps of:
    radiating said output signal into space;
    receiving the radiated output signal;
    detecting a characteristic of the received output signal; and
    performing said amplifying step in response to said characteristic of the received output signal.

10. The method according to claim 9, further comprising the step of transmitting said charatteristic of said received signal from said receiver location to said transmitter location.

11. The method according to claim 1, further comprising the step of:
    adjusting an amplitude of said distorted modulated signal prior to amplification by said amplifying step.

12. The method according to claim 11, where in said attribute of said output signal is a power level, and wherein said adjusting step alters a condition of said attribute sufficiently to cause selection of a different lookup table of said set as said current lookup table by said selecting step.

13. The method according to claim 1, wherein lookup tables of said set are associated with a particular condition of said operating attribute different from a condition of said operating attribute of a next lookup table by a predetermined amount.

14. The method according to claim 13, wherein said predetermined amount is ½ dB.

15. The method according to claim 13, wherein said predetermined amount is an amount less than an accurate resolution of detecting said condition of said attribute according to said detecting step.

16. The method according to claim 15, further comprising the step of:

grouping lookup tables of said set to provide a plurality of groups of lookup tables, wherein selection of any lookup table of a group of lookup tables substantially only results in an amplitude adjustment difference between selection of any other lookup table of said group when implemented.

17. A system for predistorting a signal to be amplified, said system comprising:

means for storing a set of lookup tables of predistortion parameters for correcting an amplified signal, wherein lookup tables of said set correspond to different power levels of said amplified signal;

means for measuring a power level of said amplified signal;

means for selecting a current lookup table of said set for use in predistorting a signal, wherein selection of a current lookup table by said selecting means is at least in part a function of said measured power level;

means for accepting a signal to be amplified;

means for distorting said accepted signal as a function of said current lookup table; and means for amplifying said distorted signal to supply said amplified signal.

18. The system according to claim 17, further comprising:

means for radiating said amplified signal;

means for receiving the radiated signal;

means for detecting in-phase and quadrature components of the received signal; and means for updating ones of said predistortion parameters corresponding to a particular power level as a function of said detected in-phase and quadratic components.

19. The system according to claim 18, further comprising:

means for transmitting update information from said receiving means to a transmitter location associated with said means for distorting.

20. The system according to claim 17, further comprising:

means for adjusting an amplitude of said distorted signal prior to amplification by said amplifying means.

21. The system according to claim 17, wherein lookup tables of said set are associated with a particular power level offset from a power level associated with a next lookup table of said set by a predetermined uniform amount.

22. The system according to claim 21, wherein said predetermined amount is ½ dB.

23. The system according to claim 21, wherein said predetermined amount is an amount less than an accurate power level measuring resolution of said means for measuring.

24. The system according to claim 23, further comprising:

means for grouping lookup tables of said set to provide a plurality of groups of lookup tables, wherein selection of any lookup table of a group of lookup tables substantially only results in an amplitude adjustment difference between selection of any other lookup table of said group when implemented.

25. A system for transmitting a signal having desired characteristics, comprising:

an amplifier accepting an input signal for manipulation and providing a manipulated input signal as an output signal;

a memory having stored therein data including correction parameters for correcting said manipulation of said input signal by said amplifier, wherein said data is identifiable in sets corresponding to different characteristics of said output signal;

a detector coupled to an output signal of said amplifier operable to detect a characteristic of said output signal;

a processor in communication with said memory and said detector, wherein said processor operates under control of an instruction set adapted to select a current set of said data for use in manipulating said modulated signal as a function of said characteristic; and a predistorter in communication with said processor and said amplifier having a memory for storing at least one set of said data, wherein said predistorter stores said current set of said data and manipulates a signal according to said current set of said data.

26. The system of claim 25, wherein said sets of data are lookup tables.

27. The system of claim 25, wherein said different characteristics are different power levels of said output signal.

28. The system of claim 25, wherein said detector operates to detect a power level of said output signal.

29. The system of claim 25, wherein said data sets comprise:

a plurality of in-phase signal component multipliers; and a plurality of quadrature signal component multipliers, wherein ones of said in-phase signal component multipliers and said quadrature signal component multipliers are associated with a particular magnitude of said signal manipulated by said predistorter.

30. The system of claim 25, further comprising:

a detector coupled to said output signal detecting at least one component of the output signal, wherein said detector provides information to update said data to reflect changes in operation of said amplifier over time.

31. The system of claim 30, wherein said at least one component detected comprises an in-phase component of said output signal.

32. The system of claim 30, wherein said at least one component detected comprises a quadrature component of said output signal.

33. The system of claim 30, wherein said updating is performed at predefined intervals.

34. The system of claim 30, wherein said updating is performed upon the occurrence of a predetermined condition.

35. The system of claim 34, wherein said predetermined condition is detection of an unacceptable output signal quality.

36. The system of claim 30, further comprising:

a receiver disposed to receive said output signal after wireless transmission of said output signal, wherein said detector is collocated with said receiver.

37. The system of claim 25, further comprising:

an attenuator disposed in a signal path between said predistorter and said amplifier adapted to adjust an amplitude of said output signal.

38. The system of claim 37, wherein said characteristic of said output signal is a power level, and wherein said attenuator alters said characteristic sufficiently to cause selection of a different data set by said processor.

39. The system of claim 25, wherein data sets of said data are associated with a particular characteristic value offset from a characteristic value of a next data set by a predetermined amount.

40. The system of claim 39, wherein said predetermined amount is ½ dB.

41. The system of claim 39, wherein said predetermined amount is an amount less than an accurate resolution of detecting said characteristic by said detector.

42. The system of claim 41, wherein said data sets stored in said memory are grouped to include a plurality of groups of data sets each including a plurality of data sets such that use of any data set of any of said groups by said predistorter substantially only results in an amplitude adjustment difference between use of any other data set of said group.

43. A predistortion amplifier system comprising:

a memory for storing a set of lookup tables of correction parameters for correcting a baseband signal;

a receiver for receiving a data signal;

a modulator for modulating a baseband signal with said data signal to supply a modulated signal;

a predistorter for predistorting said modulated signal using a selected one of said correction parameters;

an amplifier for amplifying said modulated signal to supply an output signal;

a detecting circuit for detecting a characteristic of said output signal; and a selector for selecting one table from the set of lookup tables in response to said characteristic of said output signal.

* * * * *